(12) United States Patent
Zhang et al.

(10) Patent No.: US 12,139,157 B2
(45) Date of Patent: Nov. 12, 2024

(54) MINIMAL-PREREQUISITE INTERACTION PROTOCOL FOR DRIVER-ASSISTED AUTOMATED DRIVING

(71) Applicant: GM Global Technology Operations LLC, Detroit, MI (US)

(72) Inventors: Yuan Zhang, Shanghai (CN); Wenyuan Qi, Shanghai (CN); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 316 days.

(21) Appl. No.: 17/742,660

(22) Filed: May 12, 2022

(65) Prior Publication Data

US 2023/0339491 A1 Oct. 26, 2023

(30) Foreign Application Priority Data

Apr. 25, 2022 (CN) .......................... 202210441230.6

(51) Int. Cl.
*B60W 50/10* (2012.01)
*B60K 35/00* (2024.01)
(Continued)

(52) U.S. Cl.
CPC ............ *B60W 50/10* (2013.01); *B60W 50/16* (2013.01); *B60W 60/005* (2020.02); *B60K 35/00* (2013.01);
(Continued)

(58) Field of Classification Search
CPC .... B60W 50/10; B60W 50/16; B60W 60/005; B60W 2050/146; B60W 2540/215;
(Continued)

(56) References Cited

U.S. PATENT DOCUMENTS

| | | | |
|---|---|---|---|
| 2010/0253600 A1* | 10/2010 | Seder ........................ | G02B 1/14 345/7 |
| 2012/0173067 A1* | 7/2012 | Szczerba ............... | G06F 3/0412 701/1 |

(Continued)

FOREIGN PATENT DOCUMENTS

| | | |
|---|---|---|
| DE | 102013000131 A1 | 7/2014 |
| DE | 102014223275 A1 | 5/2015 |
| DE | 102021129568 A1 | 9/2022 |

OTHER PUBLICATIONS

Downloaded from Wayback Machine Dec. 4, 2021 edition "How to Set Up Your Infotainment Profile and Preferences" from https://www.chevrolet.com/support/vehicle/entertainment/displays-radio/infotainment-setup (Year: 2021).*

*Primary Examiner* — Peter D Nolan
*Assistant Examiner* — Tanya C Sienko
(74) *Attorney, Agent, or Firm* — Vivacqua Crane, PLLC

(57) ABSTRACT

A system comprises a computer including a processor and a memory. The memory includes instructions such that the processor is programmed to: execute an autonomous vehicle algorithm simulating vehicle operations determine whether a notification that provides information on how a driver intervention for actuation by system feature functions has been at least one of previously presently or confirmed and cause the notification to be generated. The notification includes information for responding to a finite number of driving options determined by the driver intervention for actuation by system.

20 Claims, 6 Drawing Sheets

(51) Int. Cl.
 *B60K 35/10* (2024.01)
 *B60K 35/23* (2024.01)
 *B60W 50/14* (2020.01)
 *B60W 50/16* (2020.01)
 *B60W 60/00* (2020.01)

(52) U.S. Cl.
 CPC .............. *B60K 35/10* (2024.01); *B60K 35/23* (2024.01); *B60K 2360/143* (2024.01); *B60W 2050/146* (2013.01); *B60W 2540/215* (2020.02)

(58) Field of Classification Search
 CPC .. B60W 60/0053; B60W 50/14; B60W 50/08; B60K 35/00; B60K 35/10; B60K 35/23; B60K 2360/143
 See application file for complete search history.

(56) References Cited

U.S. PATENT DOCUMENTS

| | | | |
|---|---|---|---|
| 2012/0173069 A1* | 7/2012 | Tsimhoni | B60W 30/18163 701/25 |
| 2015/0262484 A1* | 9/2015 | Victor | G09B 9/04 701/1 |

\* cited by examiner

MINIMAL-PREREQUISITE INTERACTION PROTOCOL FOR DRIVER-ASSISTED AUTOMATED DRIVING

INTRODUCTION

The present disclosure relates to techniques for notifying vehicle operators of driver intervention for actuation by system features.

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

SUMMARY

A system comprises a computer including a processor and a memory. The memory includes instructions such that the processor is programmed to: execute an autonomous vehicle algorithm simulating vehicle operations, determine whether a notification that provides information on how a driver intervention for actuation by system feature functions has been at least one of previously presented or confirmed and cause the notification to be generated. The notification includes information for responding to a finite number of driving options determined by the driver intervention for actuation by system.

In other features, the processor is further programmed to cause the notification to be displayed in a display notification region.

In other features, the display notification region comprises at least one of a head up display display region, an instrument cluster panel, or an infotainment display region.

In other features, the notification includes a display with at least one touch control command corresponding to a desired lane change or other kind of maneuvering options for the system to take, which will be used to solve the scenario-specific challenge(s) for the automated driving system.

In other features, the notification comprises at least one of a visual notification, a verbal notification, or a haptic notification.

In other features, the processor is further programmed to provide feedback, wherein the feedback includes information corresponding to operator interventions during a present ignition cycle of a vehicle.

In other features, the vehicle comprises at least one of a level 2 autonomous vehicle or a level 3 autonomous vehicle.

A system comprises a computer including a processor and a memory. The memory includes instructions such that the processor is programmed to: execute an autonomous vehicle algorithm simulating vehicle operations determine whether a notification that provides information on how a driver intervention for actuation by system feature functions has been at least one of previously presently or confirmed and cause the notification to be generated. The notification includes information for responding to a finite number of driving options determined by the driver intervention for actuation by system. The processor can also be programmed to display the notification in a display notification region.

In other features, the display notification region comprises at least one of a head up display display region, an instrument cluster panel, or an infotainment display region.

In other features, the notification includes a display at least one touch control command corresponding to a desired lane change or other kind of maneuvering options for the system to take, which will be used to solve the scenario-specific challenge(s) for the automated driving system.

In other features, the notification comprises at least one of a visual notification, a verbal notification, or a haptic notification.

In other features, the processor is further programmed to provide feedback, wherein the feedback includes information corresponding to operator interventions during a present ignition cycle of a vehicle.

In other features, the vehicle comprises at least one of a level 2 autonomous vehicle or a level 3 autonomous vehicle.

A method includes determining whether a notification that provides information on how a driver intervention for actuation by system feature functions has been at least one of previously presented or confirmed and causing the notification to be generated, wherein the notification includes information for responding to a finite number of driving options determined by the driver intervention for actuation by system.

In other features, the method includes displaying the notification in a display notification region.

In other features, the display notification region comprises at least one of a head up display display region, an instrument cluster panel, or an infotainment display region.

In other features, the notification includes a display at least one touch control command corresponding to a desired lane change or other driving option with regard to a scenario-specific challenge for an automated driving system.

In other features, the notification comprises at least one of a visual notification, a verbal notification, or a haptic notification.

In other features, the method includes generating feedback that includes information corresponding to operator interventions during a present ignition cycle of a vehicle.

In other features, the vehicle comprises at least one of a level 2 autonomous vehicle or a level 3 autonomous vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure describes a system and a process that guides a driver to proficiently assist an autonomous driving (AD) system to minimize system disengagement. In various implementations, the present disclosure can be used to guide the driver to assist level 2 and/or level 3 AD systems, which are described in greater detail below.

Figure 1:
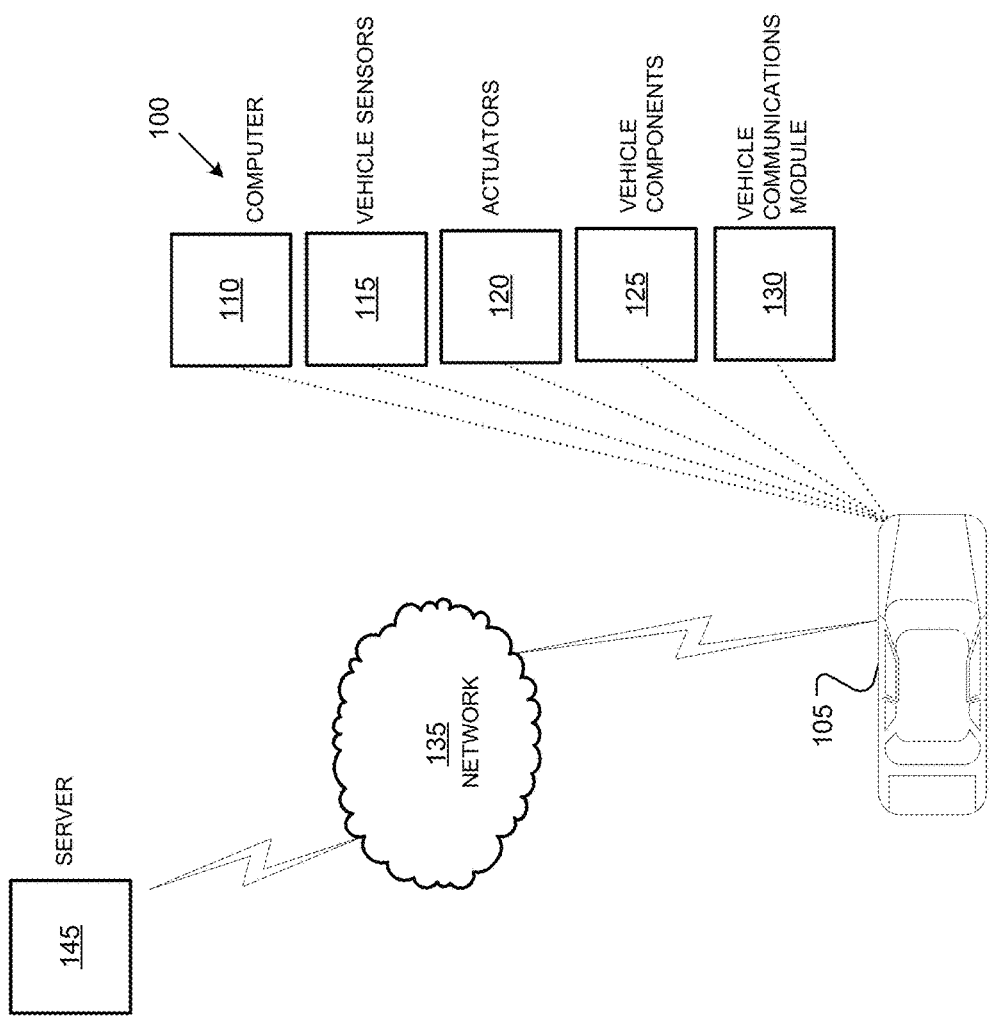
FIG. 1 is a block diagram of an example system including a vehicle.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The Society of Automotive Engineers (SAE) has defined six (6) levels of automation related to autonomous driving. More specifically, at levels 0-2, a human driver monitors or controls the majority of the driving tasks, often with no help from the vehicle 105. For example, at level 0 ("no automation"), a human driver is responsible for all vehicle operations. At level 1 ("driver assistance"), vehicle 105 sometimes assists with steering, acceleration, or braking, but the driver is still responsible for the vast majority of the vehicle control. At level 2 ("partial automation"), vehicle 105 can control steering, acceleration, and braking under certain circumstances without human interaction. At levels 3-5, vehicle 105 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 105 can handle the same tasks as at level 3 but without relying on the driver to intervene in certain driving modes. At level 5 ("full automation"), vehicle 105 can handle all tasks without any driver intervention.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110. The vehicle 105 communications network can include one or more gateway modules that provide interoperability between various networks and devices within the vehicle 105, such as protocol translators, impedance matchers, rate converters, and the like.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g., front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short-range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
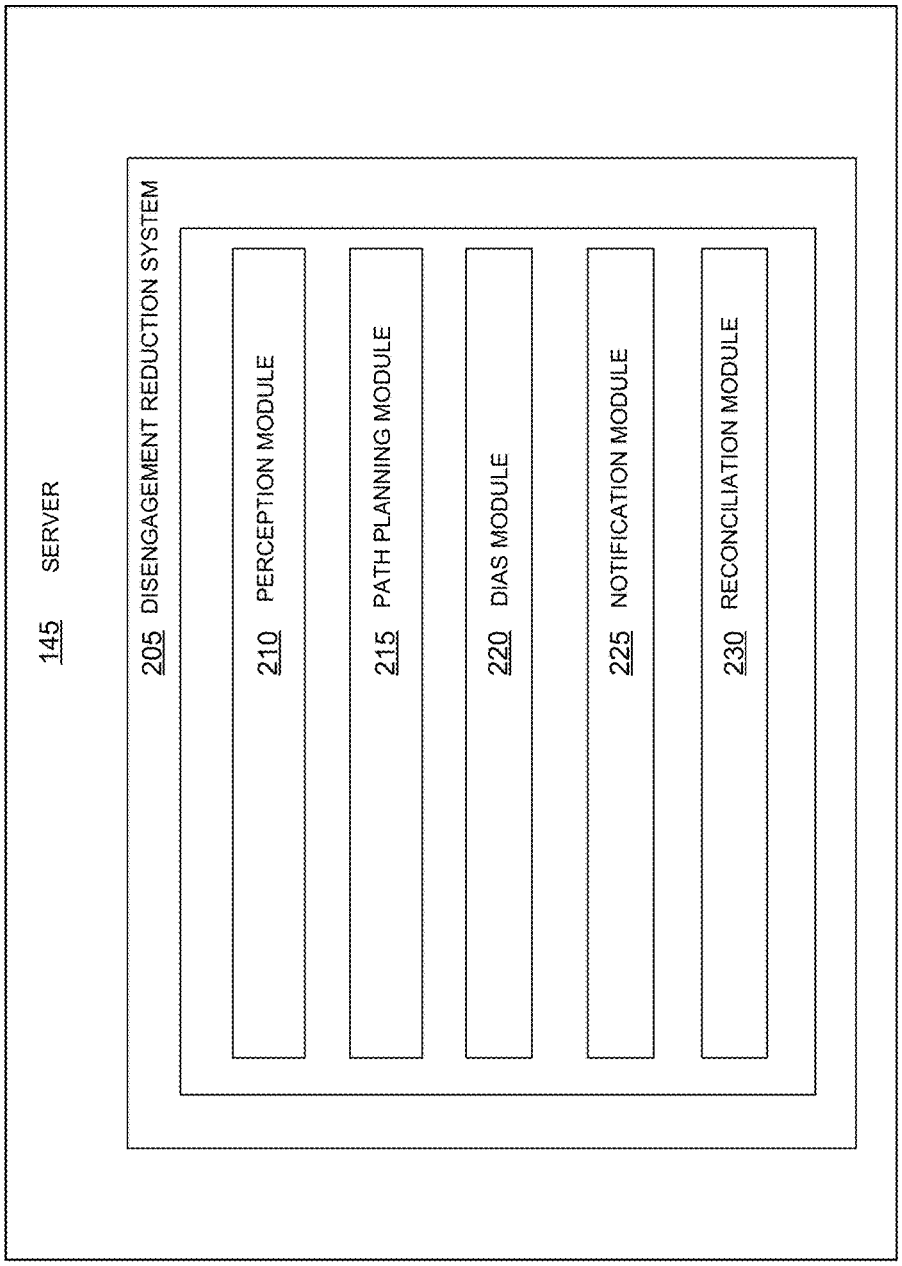
FIG. 2 is a block diagram of an example disengagement reduction system.

FIG. 2 illustrates an example computer 110 that includes a disengagement reduction system 205. As discussed herein, the disengagement reduction system 205 can provide information and/or context to an operator of the vehicle 105 regarding the features that fit into the descriptive name of a driver intervention for actuation by system (DIAS). As discussed further, the disengagement reduction system 205 can assist a driver having no prior knowledge of autonomous driving systems to become accustomed and skillful to use the DIAS feature through a learn-to-use process, and to reconcile the human-machine disagreement under low-speed driving with clarified responsibility leading to comfortable choice for the driver to make.

As shown, the disengagement reduction system 205 may include a localization and perception module 210, a path planning module 215, a driver intervention for actuation by system (DIAS) module 220, a notification module 225, and a reconciliation module 230.

The localization and perception module 210 can localize the vehicle 105 within an environment and can receive sensor data representing a sensed environment from the sensors 115, inertial measurement data from the sensors 115, e.g., inertial measurement units (IMUs), and map data from a vehicle navigation system. The inertial measurement data can include data indicative of vehicle 105 movement, such as acceleration, orientation, and/or angular velocity. The map data can include information or data on roads, traffic control devices, road markings, structures, features, and/or landmarks in one or more geographic areas, specified according to geo-coordinates, e.g., conventional latitude and longitude coordinates. In some instances, the map data can include aerial views of an area. In some instances, the map data can include ground views of an area, including 360-degree ground views. The map data can include measurements, dimensions, distances, and/or data for one or more items included in the map data and/or relative to other items included in the map data. The map data can include a digital map with data about road geometry.

The localization and perception module 210 can localize the vehicle 105 location within a map by locating the vehicle 105 relative to the identified objects, i.e., according to the distances and headings of objects relative to the vehicle 105, the localization and perception module 210 can provide a location of the vehicle 105 on the map according to GPS coordinates corresponding to the vehicle 105. For example, the localization and perception module 210 can determine a position (e.g., a local position relative to a map, an exact position relative to a lane of a road, a vehicle heading, etc.) of the vehicle 105 relative to the environment. As can be appreciated, a variety of techniques may be employed to accomplish this localization, including, for example, simultaneous localization and mapping (SLAM), particle filters, Kalman filters, Bayesian filters, and the like.

The path planning module 215 can determine a path for the vehicle 105 to traverse based on the sensed environment. For example, the path planning module 215 can incorporate suitable machine learning techniques to determine a path to traverse based on the vehicle's 105 location, the vehicle's 105 destination, sensed obstructions proximate to the vehicle 105, and the like.

Based on the sensed environment and destination, the path planning module 215 can determine one or more potential paths based on the sensed environment. For instance, the path planning module 215 may determine that the vehicle 105 can employ a lane change or maintain a current lane based on the sensed environment and the destination. In implementations, the path planning module 215 accounts for one or more other vehicles or obstacles that may be relevant in deciding whether the vehicle 105 may alter the path or potential paths.

During operation of the vehicle 105, the vehicle 105 may encounter one or more situations in which the computer 110 requests operator instructions based on the sensed environment. For example, one or more obstacles may be present within the vehicle's 105 current path. As such, the path generated by the vehicle path planning module 215 may need to be altered, or ameliorated subject to some further input(s) from the operator and/or other module(s), possibly with certain time constraint for the input(s) to be accepted. In response, the DIAS module 220 can determine a finite set of options based on data provided from the localization and perception module 210 and/or the path planning module 215. Using the data, the DIAS module 220 selects the scenario-specific finite options that the operator can select from. Based on input from the operator, the DIAS module 220 can generate one or more control signals that actuate the vehicle 105 to perform the option selected by the operator. It is understood that the DIAS module 220 can be included in a level 2 or a level 3 autonomous driving system. In this manner, the DIAS module 220 allow the operator to select a preferred vehicle 105 actuation based on a finite number of vehicle actuation options pertaining to the scenario-specific challenge for the AD system.

Figure 3:
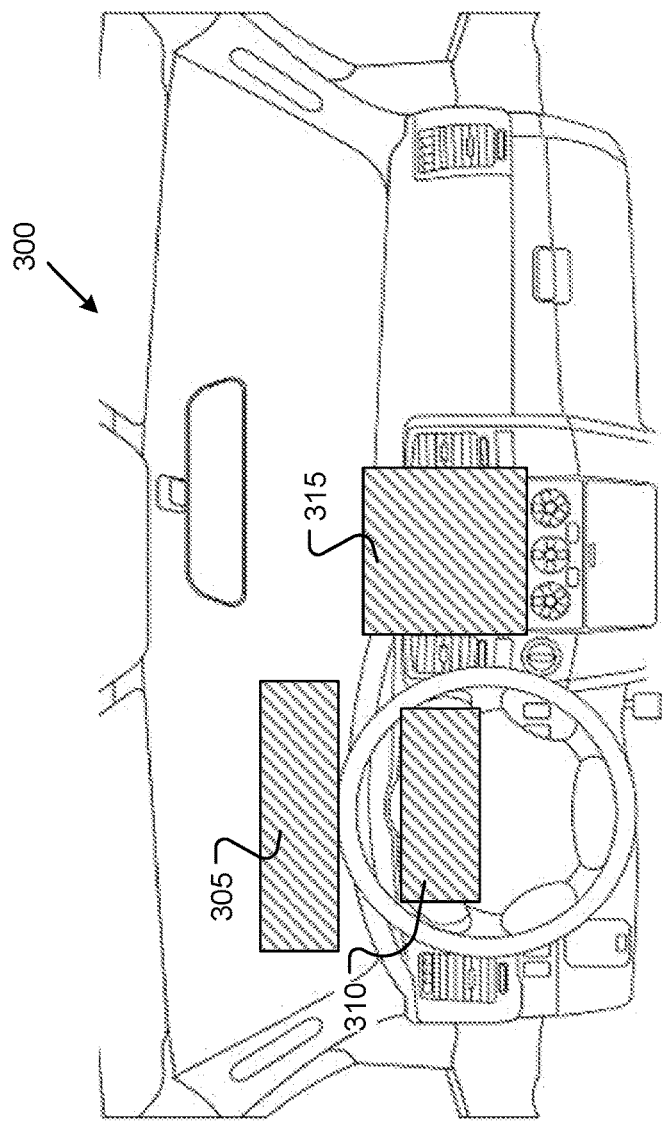
FIG. 3 is a diagrammatic illustration of a portion of an interior of a vehicle.

The notification module 225 can generate one or more notifications to inform an operator of the vehicle 105 of the functionality provided by the DIAS module 220. The notification module 225 can generate a visual notification, an audible notification, a haptic notification, or the like. Referring to FIG. 3, FIG. 3 illustrates an example interior environment 300 of the vehicle 105. As shown, the interior environment 300 can include one or more display notification regions 305, 310, 315. The display notification region 305 can correspond to a head up display display (HUD) region, the display notification region 310 can correspond to an instrument cluster panel, and the display notification region 315 can correspond to an infotainment display region.

In some instances, the notification module 225 generates a notification, such as a visual notification, i.e., button, and/or audio notification, for the operator to learn additional information on how to interface with the DIAS module 220. For example, the notification module 225 generates a button in the display notification region 315 such that the operator can interface with the button if the operator would like to understand how the DIAS module 220 operates.

Figure 4:
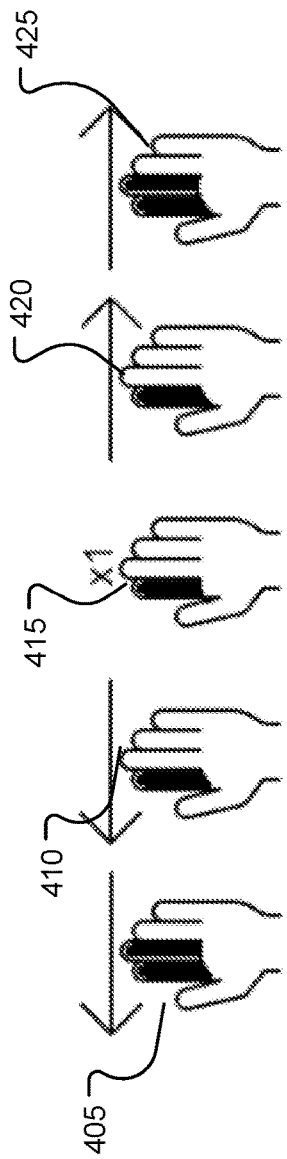
FIG. 4 is a diagrammatic illustration of example touch controls for responding to options generated by a driver intervention for actuation by system.

In response to the operator's interaction with the button, the notification module 225 can generate one or more visual displays instructing the operator how the DIAS module 220 operates, how to select a desired DIAS option based on one or more options presented by the DIAS module 220, and that the operator need not be anxious since any resulting risk may be no more than autonomous driving disengagement. FIG. 4 illustrates example touch controls 405, 410, 415, 420, 425 that can be performed by the user to select one of the DIAS options via the HMI.

FIG. 4 illustrates touch control commands corresponding to a desired lane for the vehicle 105 to traverse. Touch control 405 represents a requested lane change in which the vehicle transitions two (2) lanes to the left. In this instance, touch control 405 comprises a swipe left with two fingers interfacing with the HMI, such as a touchscreen of the infotainment system. Touch control 405 represents a requested lane change in which the vehicle transitions two (2) lanes to the left. In this instance, touch control 405 comprises a swipe left with two fingers interfacing with the HMI. Touch control 410 represents a requested lane change in which the vehicle transitions one (1) lane to the left. In this instance, touch control 410 comprises a swipe left with one finger interfacing with the HMI. Touch control 415 represents a request to stay in the current lane. In this instance, touch control 415 comprises a single "tap," or brief interface, of one finger with the HMI. Touch control 420 represents a requested lane change in which the vehicle transitions one (1) lane to the right. In this instance, touch control 420 comprises a swipe right with one finger interfacing with the HMI. Touch control 425 represents a requested lane change in which the vehicle transitions two (2) lanes to the right. In this instance, touch control 425 comprises a swipe right with two fingers interfacing with the HMI.

While the notification module 225 can illustrate default settings, or default actions for selecting an option (such as those illustrated in FIG. 4), it is understood that the operator can also program the disengagement reduction system 205 to allow the operator to select the preferred haptic feedback for the responding to the finite set of options. It is understood that the operator may also provide the desired selection using a voice command.

Once the vehicle 105 reaches its destination, the notification module 225 can provide feedback to the operator based on any operator interventions during the present ignition cycle and/or take over performance of the operator regarding the instances of scenarios experienced during past ignition cycles. The feedback may be in form of visual feedback, audio feedback, or the like. The notification module 225 may also request confirmation from the operator that the operator understands the features pertaining to the DIAS module 220.

The reconciliation module 230 can attempt to reconcile any human-machine disagreement when the vehicle 105 is traveling below a predetermined speed threshold, i.e., relatively low speed such as five miles-per-hour, ten miles-per-hour, etc. As discussed below in relation to FIG. 6, the reconciliation module 230 can attempt to reconcile any misalignments, i.e., disagreement, via an iterative approach based on the computer's 110 perception of environment being updated with the in-agreement part of path planning being enforced.

One or more of the modules described above may be implemented as one or more machine learning models that undergo supervised, unsupervised, semi-supervised, or reinforcement learning and perform classification, e.g., binary or multiclass classification, regression, clustering, dimensionality reduction, and/or such tasks. Examples of such models include, without limitation, artificial neural networks (ANN) (such as a recurrent neural networks (RNN) and convolutional neural network (CNN)), decision tree models (such as classification and regression trees (CART)), ensemble learning models (such as boosting, bootstrapped aggregation, gradient boosting machines, and random forests), Bayesian network models (e.g., naive Bayes), principal component analysis (PCA), support vector machines (SVM), clustering models (such as K-nearest-neighbor, K-means, expectation maximization, hierarchical clustering, etc.), linear discriminant analysis models. In some instances, the more machine learning models may be trained via the server 145 and provided to the computer 110 via the network 135.

Figure 5:
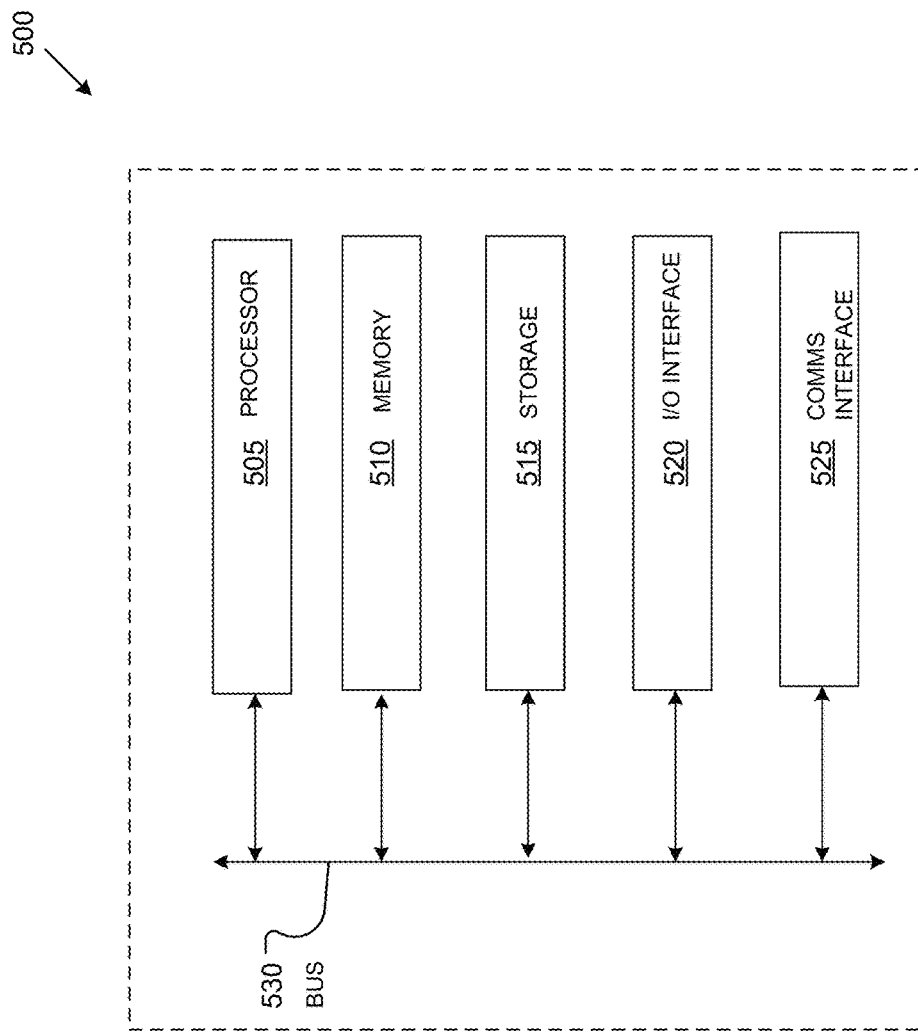
FIG. 5 is a block diagram of an example computing device.

FIG. 5 illustrates an example computing device 500, i.e., computer 110 and/or server(s) 145 that may be configured to perform one or more of the processes described herein. As shown, the computing device 500 can comprise a processor 505, memory 510, a storage device 515, an I/O interface 520, and a communication interface 525. Furthermore, the computing device 500 can include an input device such as a touchscreen, mouse, keyboard, etc. In certain implementations, the computing device 500 can include fewer or more components than those shown in FIG. 3.

In particular implementations, processor 505 includes hardware for executing instructions, such as those making up a computer program. As an example, and not by way of limitation, to execute instructions, processor 505 may retrieve (or fetch) the instructions from an internal register, an internal cache, memory 510, or a storage device 515 and decode and execute them.

The computing device 500 includes memory 510, which is coupled to the processor 505. The memory 510 may be used for storing data, metadata, and programs for execution by the processor(s). The memory 510 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 510 may be internal or distributed memory.

The computing device 500 includes a storage device 515 includes storage for storing data or instructions. As an example, and not by way of limitation, storage device 515 can comprise a non-transitory storage medium described above. The storage device 515 may include a hard disk drive (HDD), flash memory, a Universal Serial Bus (USB) drive or a combination of these or other storage devices.

The computing device 500 also includes one or more input or output ("I/O") devices/interfaces 520, which are provided to allow a user to provide input to (such as user strokes), receive output from, and otherwise transfer data to and from the computing device 500. These I/O devices/interfaces 520 may include a mouse, keypad or a keyboard, a touch screen, camera, optical scanner, network interface, modem, other known I/O devices or a combination of such I/O devices/interfaces 520. The touch screen may be activated with a writing device or a finger.

The I/O devices/interfaces 520 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 520 is configured to provide graphical data to a display for presentation to a user. The graphical data may be representative of one or more graphical user interfaces and/or any other graphical content as may serve a particular implementation.

The computing device 500 can further include a communication interface 525. The communication interface 525 can include hardware, software, or both. The communication interface 525 can provide one or more interfaces for communication (such as, for example, packet-based communication) between the computing device and one or more other computing devices 500 or one or more networks. As an example, and not by way of limitation, communication interface 525 may include a network interface controller (NIC) or network adapter for communicating with an Ethernet or other wire-based network or a wireless NIC (WNIC) or wireless adapter for communicating with a wireless network, such as a WI-FI. The computing device 500 can further include a bus 530. The bus 530 can comprise hardware, software, or both that couples components of computing device 500 to each other.

Figure 6:
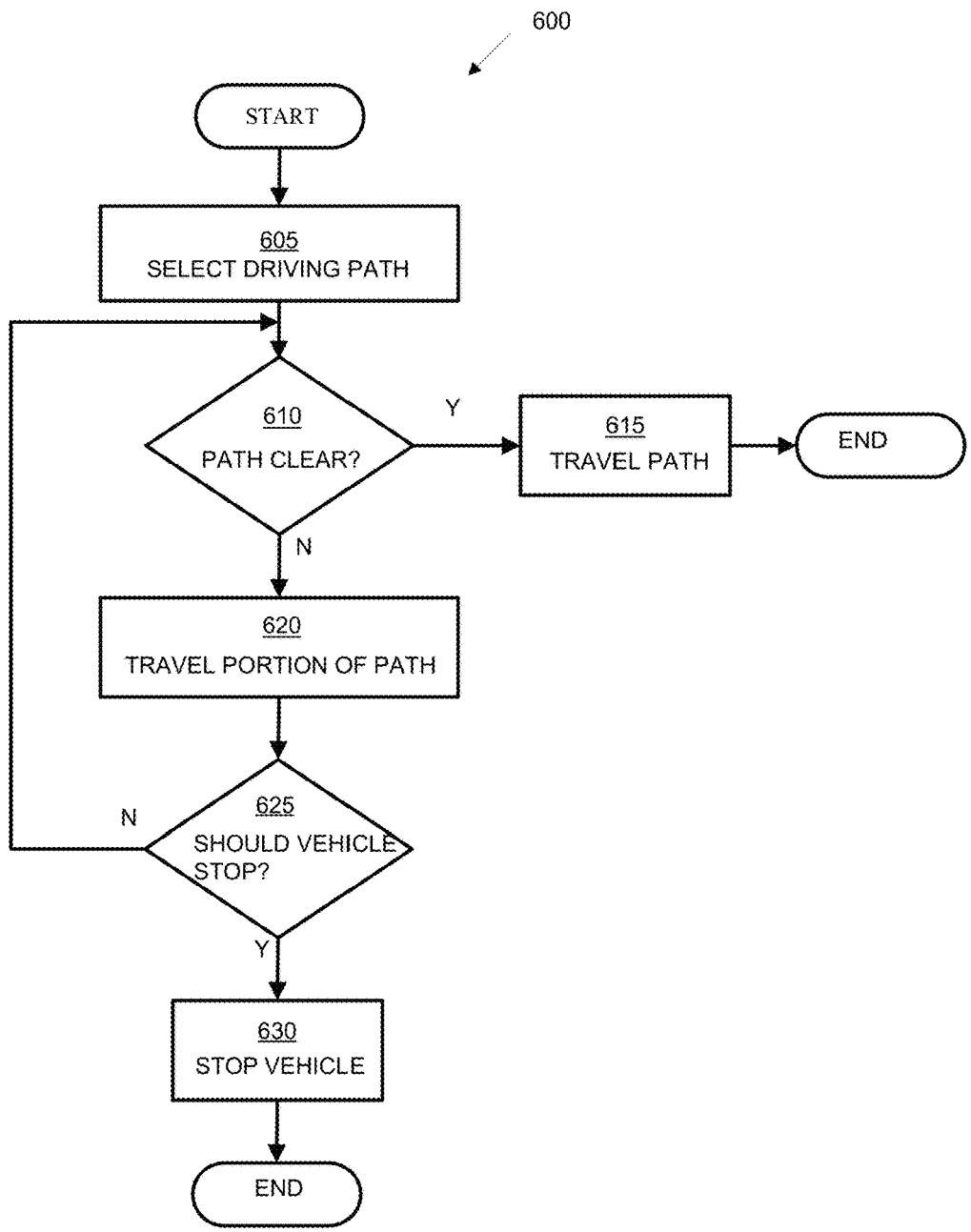
FIG. 6 is a flow diagram illustrating an example process for reconciling a human-machine misalignment.

FIG. 6 is a flowchart of an example process 600 for reconciling a human-machine misalignment, e.g., disagreement, according to the techniques described herein. Blocks of the process 600 can be executed by the computer 110. The process 600 begins at block 605 in which an operator delineates, or selects, a driving path for the vehicle 105 to traverse. At block 610, a determination is made whether the delineated path can be traversed without incident, i.e., no presently perceived obstacles within the delineated path. If yes, the computer 110 causes the vehicle 105 to traverse the delineated path at block 615.

If no, the computer 110 causes the vehicle 105 to traverse a portion of the delineated path based on the portion of the path can be delineated at block 620. It is understood that the computer 110 can also request that the driver update the delineated path. It is also understood that the computer 110 may continue to receive updated sensor data from the sensors 115 indicative of the perceived environment. At block 625, the computer 110 determines whether the vehicle 105 should stop due to unreconciled disagreement due to perceived obstacles within the current path. If yes, the computer 110 can cause the vehicle 105 to continue traversing the delineated path after the operator accepts claim of responsibility and/or the computer 110 can disengage the vehicle 105 at block 630. Otherwise, the process 600 returns to block 610.

Figure 7:
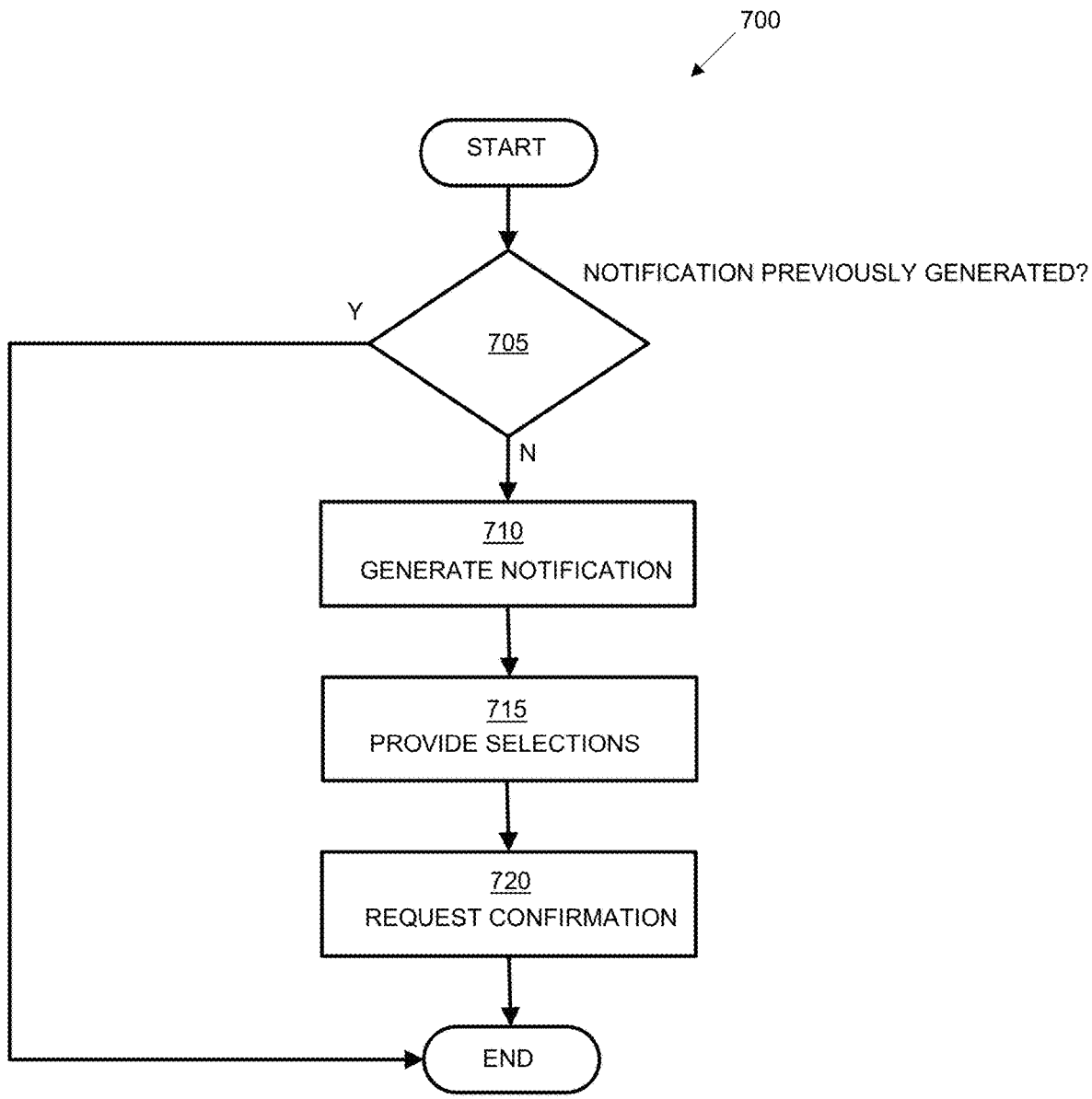
FIG. 7 is a flow diagram illustrating an example process for notifying a vehicle operator to the features of the driver intervention for actuation by system.

FIG. 7 is a flowchart of an example process 700 for notifying an operator of the vehicle 105 to the features of the DIAS module 220 according to the techniques described herein. Blocks of the process 700 can be executed by the computer 110. The process 700 begins at block 705 in which a determination is made whether a notification notifying the operator of the features of the DIAS module 220 has been previously generated and confirmed by the operator.

If the notification notifying the operator of the features of the DIAS module 220 has been previously generated and confirmed by the operator, the process 700 ends. Otherwise, the computer 110 generates one or more notifications to notify the operator of the DIAS module 220 features at block 710, typically in a way that is deemed informative but not intrusive. For example, the notifications can be displayed via the display notification regions 305, 310, 315. At block 715, the computer generates one or more notifications for providing a selection to options generated by the DIAS module 220, such as those described above with reference to FIG. 4. At block 720, the computer 110 generates a request, such as a visual request, requesting the operator confirm the operator understand the features of the DIAS module 220. The process 700 then ends.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory in a vehicle, the memory including instructions such that the processor is programmed to:
   determine whether a notification that provides information on how a driver intervention for actuation by system feature functions has been at least one of previously presented or confirmed;
   cause the notification to be generated, wherein the notification includes information for responding to a finite number of driving options determined by the driver intervention for actuation by system, wherein the notification includes displaying at least one touch control command corresponding to a delineated path including a desired lane change or other driving option with regard to a scenario-specific challenge for an automated driving system;
   receive the at least one touch control command by the driver corresponding to the delineated path;
   determine if a perceived obstacle is within the delineated path using sensors in the vehicle;
   command the vehicle to travel the delineated path if the perceived obstacle is not within the delineated path;
   command the vehicle to travel a portion of the delineated path when the perceived obstacle is within the delineated path and the portion of the delineated path can be traversed without contacting the perceived obstacle;
   stop the vehicle when the perceived obstacle is within the delineated path and the delineated path cannot be traversed without contacting the perceived obstacle;
   request the driver to update the delineated path when the perceived obstacle is within the delineated path; and receive a claim of responsibility by the driver and command the vehicle to continue on the delineated path when the perceived obstacle is within the delineated path and the vehicle is traveling below a predetermined speed threshold.

2. The system of claim 1, wherein the processor is further programmed to cause the notification to be displayed in a display notification region.

3. The system of claim 2, wherein the display notification region comprises at least one of a head up display display region, an instrument cluster panel, or an infotainment display region.

4. The system of claim 1, wherein the predetermined speed threshold is five miles per hour.

5. The system of claim 1, wherein the notification comprises at least one of a visual notification, a verbal notification, or a haptic notification.

6. The system of claim 1, wherein the processor is further programmed to provide feedback, wherein the feedback includes information corresponding to operator interventions during a present ignition cycle of a vehicle.

7. The system of claim 6, wherein the vehicle comprises at least one of a level 2 autonomous vehicle or a level 3 autonomous vehicle.

8. A vehicle comprising:
a driver intervention for actuation by system;
a touch display;
a computer in communication with the driver intervention for actuation system and the touch display, the computer including a processor and a memory, the memory including instructions such that the processor is programmed to:
determine whether a notification that provides information on how the driver intervention for actuation by system feature functions has been at least one of previously presented or confirmed;
cause the notification to be generated on the touch display, wherein the notification includes information for responding to a finite number of driving options determined by the driver intervention for actuation by system, wherein the notification includes displaying at least one touch control command corresponding to a delineated path including a desired lane change or other driving option with regard to a scenario-specific challenge for an automated driving system;
receive the at least one touch control command by the driver corresponding to the delineated path;
determine if a perceived obstacle is within the delineated path using sensors in the vehicle;
command the vehicle to travel the delineated path if the perceived obstacle is not within the delineated path;
command the vehicle to travel a portion of the delineated path when the perceived obstacle is within the delineated path and the portion of the delineated path can be traversed without contacting the perceived obstacle;
stop the vehicle when the perceived obstacle is within the delineated path and the delineated path cannot be traversed without contacting the perceived obstacle;
request the driver to update the delineated path when the perceived obstacle is within the delineated path; and
receive a claim of responsibility by the driver and command the vehicle to continue on the delineated path when the perceived obstacle is within the delineated path and the vehicle is traveling below a predetermined speed threshold.

9. The vehicle of claim 8, wherein the notification is displayed in a display notification region comprising at least one of a head up display display region, an instrument cluster panel, or an infotainment display region.

10. The vehicle of claim 8, wherein the predetermined speed threshold is five miles per hour.

11. The vehicle of claim 8, wherein the notification comprises at least one of a visual notification, a verbal notification, or a haptic notification.

12. The vehicle of claim 8, wherein the processor is further programmed to provide feedback, wherein the feedback includes information corresponding to operator interventions during a present ignition cycle of a vehicle.

13. The vehicle of claim 12, wherein the vehicle comprises at least one of a level 2 autonomous vehicle or a level 3 autonomous vehicle.

14. A method for operating a vehicle, the method comprising:
determining whether a notification that provides information on how a driver intervention for actuation by system feature functions has been at least one of previously presented or confirmed; and
causing the notification to be generated, wherein the notification includes information for responding to a finite number of driving options determined by the driver intervention for actuation by system, wherein the notification includes displaying at least one touch control command corresponding to a delineated path including a desired lane change or other driving option with regard to a scenario-specific challenge for an automated driving system;
receiving the at least one touch control command by the driver corresponding to the delineated path;
determining that a perceived obstacle is within the delineated path using sensors in the vehicle;
commanding the vehicle to travel the delineated path when the perceived obstacle is not within the delineated path;
commanding the vehicle to travel a portion of the delineated path when the perceived obstacle is within the delineated path and the portion of the delineated path can be traversed without contacting the perceived obstacle;
stopping the vehicle when the perceived obstacle is within the delineated path and the delineated path cannot be traversed without contacting the perceived obstacle;
requesting the driver to update the delineated path when the perceived obstacle is within the delineated path; and
receiving a claim of responsibility by the driver and command the vehicle to continue on the delineated path when the perceived obstacle is within the delineated path and the vehicle is traveling below a predetermined speed threshold.

15. The method of claim 14, further comprising displaying the notification in a display notification region.

16. The method of claim 15, wherein the display notification region comprises at least one of a head up display display region, an instrument cluster panel, or an infotainment display region.

17. The method of claim 14, wherein the predetermined speed threshold is five miles per hour.

18. The method of claim 14, wherein the notification comprises at least one of a visual notification, a verbal notification, or a haptic notification.

19. The method of claim 14, further comprising generating feedback that includes information corresponding to operator interventions during a present ignition cycle of a vehicle.

20. The method of claim 19, wherein the vehicle comprises at least one of a level 2 autonomous vehicle or a level 3 autonomous vehicle.

* * * * *